United States Patent [19]

Neff

[11] 4,143,358

[45] Mar. 6, 1979

[54] WAND LAMP CONTROL

[75] Inventor: Marion W. Neff, Irving, Tex.

[73] Assignee: Recognition Equipment Incorporated, Irving, Tex.

[21] Appl. No.: 774,824

[22] Filed: Mar. 7, 1977

Related U.S. Application Data

[63] Continuation of Ser. No. 596,170, Jul. 16, 1975, abandoned.

[51] Int. Cl.² ............................................. G06K 9/02
[52] U.S. Cl. ................... 340/146.3 AG; 340/146.3 SY
[58] Field of Search ............... 340/146.3 SY, 146.3 H, 340/146.3 AG, 146.3 F; 250/553, 205, 567

[56] References Cited

U.S. PATENT DOCUMENTS

| | | | |
|---|---|---|---|
| 3,752,961 | 8/1973 | Torrey | 250/555 |
| 3,783,273 | 1/1974 | Strohschneider | 250/568 |
| 3,944,979 | 3/1976 | Kwok | 340/146.3 AG |

Primary Examiner—Joseph M. Thesz
Attorney, Agent, or Firm—John E. Vandigriff

[57] ABSTRACT

A lamp control for a hand-held OCR wand having a photosensor array positioned to sense light reflected into the wand through a reading aperture therein. A lamp is carried by the wand for illuminating the field facing the reading aperture. Recognition means connected to the array produces a control state when no light is reflected onto the array and a timer responsive to the control state is operable after a predetermined time delay to reduce the excitation of the lamp. Timer reset means responsive to reset of said control state restores normal lamp excitation.

8 Claims, 3 Drawing Figures

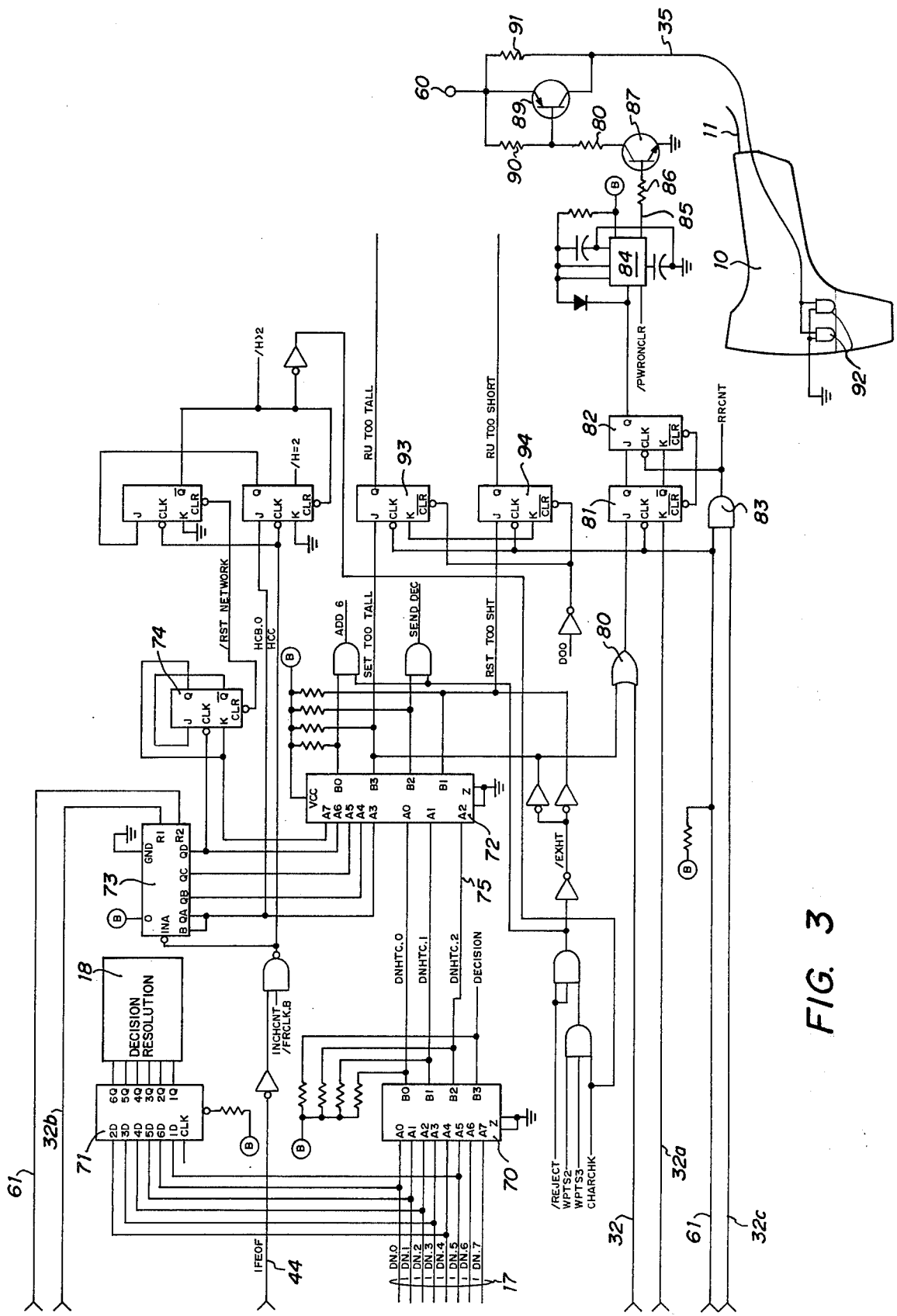

WAND LAMP CONTROL

This is a continuation of application Ser. No. 596,170, filed July 16, 1975, now abandoned.

This invention relates to optical character recognition, and more particularly to selective control of the intensity of lamps illuminating a scan field of a hand-held wand.

In optical character recognition systems where hand-held wands are employed, wand housings have scan apertures which face documents on which characters to be read are located. One or more lamps in the wand provide for illumination of the data field across which the wand is passed. Data to be used in an associated system is thus automatically acquired. For example, in point of sale transactions, price tags on articles of merchandise can readily be scanned by a hand-held wand to provide an input to a cash register as well as to an inventory control system.

There are many time intervals during which the wand is not used. Further, constant use with the illuminating lamps at high intensity causes portions of a wand undesirably to heat up. Yet the wand must be ready for use with lamps at full intensity at any time. In accordance with the present invention, the control of the intensity of the lamps is provided in response to the nature of the data sent by an array of photosensitive elements mounted in the wand adjacent to a scan aperture. It has been found desirable not only to operate the lamps at low intensity during periods of inactivity for extending the life of the lamps, but also to avoid undue heating of the wand structure itself, which otherwise would occur if during long periods the lamps were on at full intensity.

In accordance with the present invention, a first signal is developed for each row of sensors in a two dimensioned sensor array whose output signifies only black field response during a given scan of the field viewed by the sensing array. A second signal is developed when in response to processing of the output of the array, a character too tall to satisfy predetermined limitations is deemed to be present.

When the foregoing signals are generated, means are provided in response to the first signal to set a flag state when a predetermined number of the first signal are produced for a given frame. Means are also provided to set the flag state when the second signal appears. A timer then produces an output signal in response to the flag state after a predetermined time delay to reduce the excitation of the lamps. A further circuit instantly resets the counter when any white signal appears in any row during a subsequent scan of the data field.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

FIGS. 2 and 3 are detailed circuit diagrams showing the generation of control signals to dim the lamps in the wand.

Figure 1:
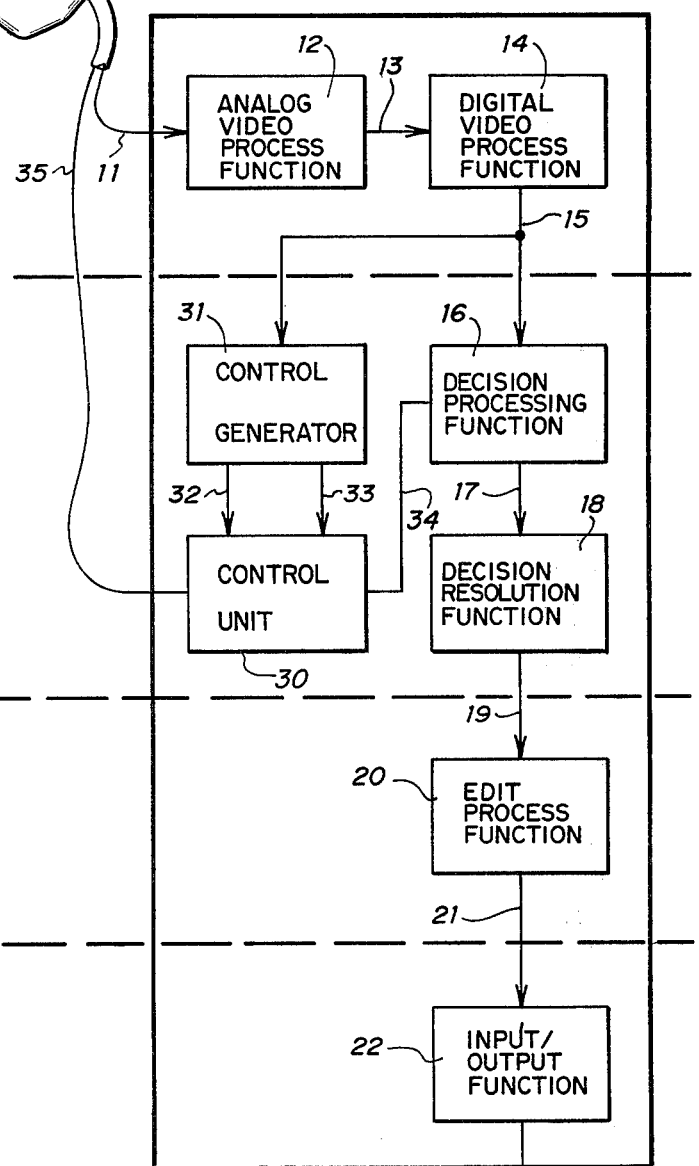
FIG. 1 is a block diagram showing an overall OCR wand system.

Referring to FIG. 1, an OCR wand functional flow diagram has been presented wherein a hand-held wand unit 10 operates to perform a data lift function and to feed resultant signals by way of channel 11 to an analog digital converter 12. A two-dimensional array of photo sensors is mounted in wand 10 which views a data field over which wand 10 is passed. The outputs from the photo-sensors are repeatedly scanned at a high rate effectively to freeze a character image at a plurality of positions relative to the array. The signals are preconditioned to either a black or white state after conversion to digital format. More particularly, the output of the converter 12 is supplied by way of channel 13 to a digital video processor 14. The video processor 14 provides on channel 15 a set of output signals representative of the black/white state of each of a plurality of areas on a data field as viewed at any instant by the array of photosensitive elements. In one embodiment, a photo-sensor array of 12 by 38 elements are used. In that case, channel 15 comprised 12 bits per row transferred in parallel to a decision processor 16 with the 38 rows being transferred serially.

Decision processor 16 provides an output on channel 17 leading to a decision resolution unit 18 whose output is applied by way of channel 19 to an edit unit 20 whose output is applied by way of channel 21 to an input/output unit 22. Thus, a train of multi-bit signals identifying the successive characters read from a data field are generated as the hand-held wand 10 is swept across the field.

In accordance with the present invention, a control unit 30 is provided for operation in connection with decision processor 16. Channel 15 is connected as an input channel to a control generator 31, as well as to decision processor 16. Generator 31 provides two outputs to controller 30 by way of channels 32 and 33 which are of particular interest in the present invention as will be explained. Controller 30 is connected by way of channel 34 to a decision process unit 16 and is connected by way of channel 35 to wand 10.

In accordance with the present invention, a predetermined state appearing on either channels 32 or 33 will actuate a timer in controller 30 which will serve, after a predetermined time delay to cause the intensity of a lamp in wand 10 to be dimmed. In the embodiment to be described the lamp in wand 10 will be dimmed beginning three seconds after the appearance of a predetermined state on either line 32 or line 33.

The state on line 32 will appear when the wand sees an all-black field. Such a field is so interpreted by the wand when it looks at a totally black, non-reflective surface or when it looks into space, i.e., when there is no reflection of light back into the wand. The state will appear on channel 33 when the data on channel 15 represents a character present on a field which is taller than any allowed or acceptable character.

The intensity of the lamp in wand 10 will then be instantly raised to its bright state upon the appearance of any signal on channel 15 indicative of the presence of a white reflection in any substantial portion of the field viewed by the sensor array in wand 10.

Figure 2:
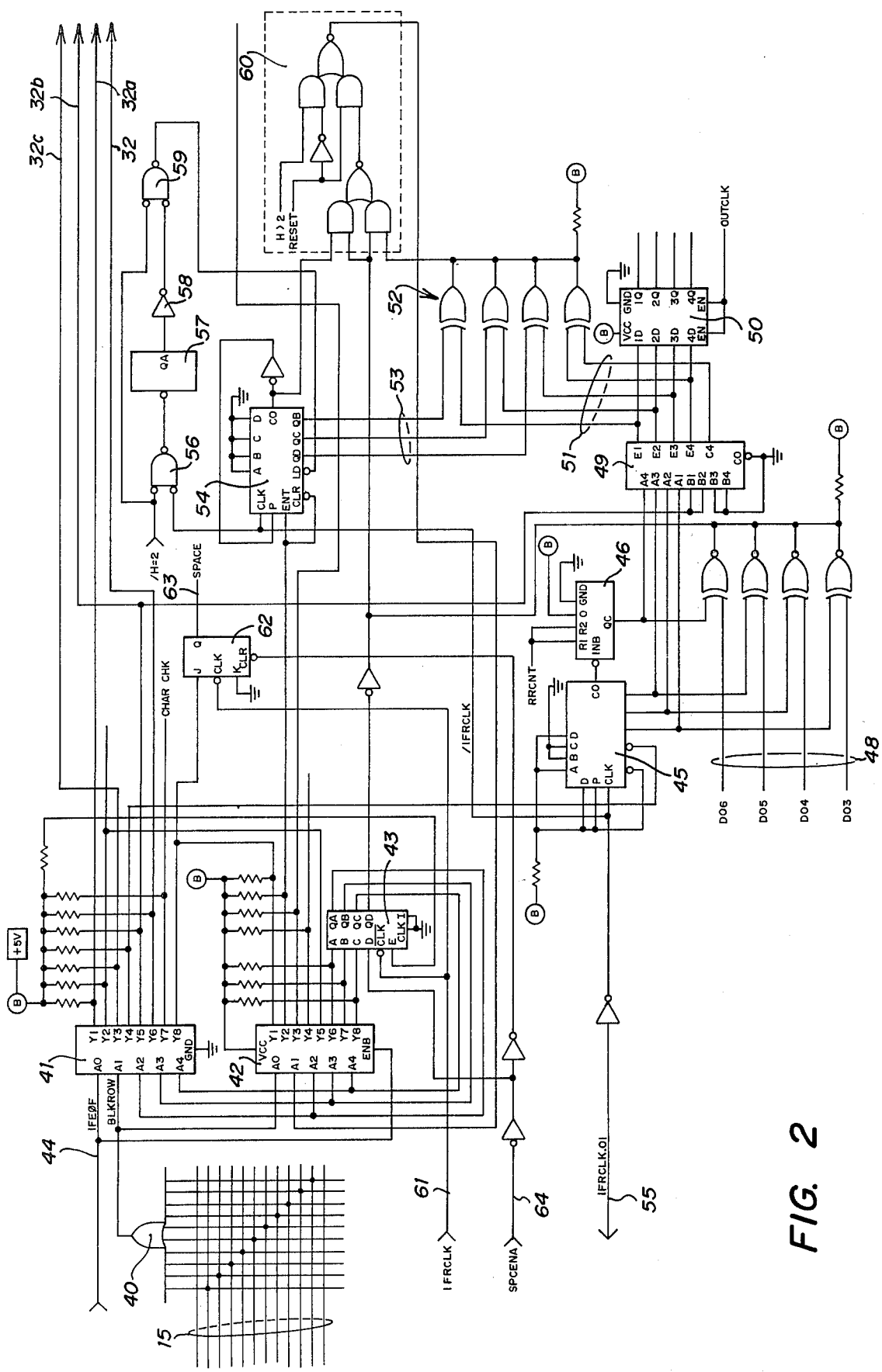

Referring now to FIG. 2, line 15, comprising twelve channels, is connected by way of a ten input OR gate 40 to input A1 of a ROM 41 and to input A0 of a ROM 42. The ten inputs are from ten of twelve sensors in a given row. The entire array of 38 rows are scanned.

ROMs 41 and 42, operating in conjunction with a shift register 43, serve to produce an output on line 32 when all of the rows scanned in a given frame for a given field are all black. This means that the signal applied from the OR gate 40 to ROM 41 would have all black input states during the entire scan of the 38 rows of the field.

More particularly, the A0 input of ROM 41 is supplied with the signal by way of line 44 which indicates that a complete scan of the 38 rows of a given frame has been completed, i.e., that the 38th row has been scanned.

The other inputs to ROM 41 are generated in the circuit of FIG. 2. In this circuit, counters 45 and 46 cooperate to serve as a row counter, energizing an output logic 47 which represent in digital code the row count for the bottom of the last character previously identified.

The outputs of the counters 45 and 46 are also supplied to an adder 49 whose output is connected to a storage register 50, which provides an output indicating the position of the character being read in the 38 row field. The output of adder 49 is also supplied as one set of inputs on channels 51 to a comparator 52. The second set of inputs to comparator 52 is supplied by way of channels 53. Lines 53 have outputs determined by the operation of a white row counter 54. A row clock pulse source (not shown) is connected by way of channel 55 to counter 45 and to the white row counter 54 as well as to an OR gate 56. OR gate 56 feeds the clock input of a flip/flop 57 whose output is inverted in unit 58 and applied by way of OR gate 59 to an input of counter 54.

The output of comparator 52 is applied by way of logic circuit 60 to the A1 input of the ROM 42. An intraframe row clock 61 provides clock pulses coincident with the scanning of each row of a given frame. Such clock pulses are applied to the clock input terminal of shift register 43 and to the clock input terminal of a flip/flop 62. Flip/flop 62 provides, on output line 63, an indication that wand 10 is looking at a space between characters on a given field. The flip/flop 62 is controlled by the last output of ROM 41 and the first output of ROM 42. Flip/flop 62 is cleared by a space enable signal on line 64 which is generated in the decision resolution unit 18.

In the circuit FIG. 2, a reset state appears on line 32a to reset the dim light flag at the start of the counting of the rows in each frame. Also appearing at the output of ROM 41 is a reset state on line 32b. This reset state occurs at the beginning of each frame to initialize the system.

It will not be appreciated that the circuit shown in FIG. 2 performs many functions, most of which are not related to the control of the intensity of the lamp in wand 10. The latter function is carried out by producing a selected state on line 32, which is connected as an input to the circuit of FIG. 3. The predetermined state on line 32 appears during state 7 of ROM 41. ROM 41 is a 32 × 8 bit ROM preprogrammed as indicated in Table 1.

TABLE I

|    | A4 | A3 | A2 | A1 | A0 | B7 | B6 | B5 | B4 | B3 | B2 | B1 | B0 |
|----|----|----|----|----|----|----|----|----|----|----|----|----|----|
| 0  |    |    |    |    |    |    |    |    |    |    |    |    |    |
| 1  |    |    |    |    | 1  |    |    |    |    |    |    |    |    |
| 2  |    |    |    | 1  |    |    |    |    |    |    |    |    |    |
| 3  |    |    |    | 1  | 1  |    |    |    |    |    |    |    |    |
| 4  |    |    | 1  |    |    |    |    |    |    | X  |    |    | X  |
| 5  |    |    | 1  |    | 1  |    |    |    |    | X  |    |    |    |
| 6  |    |    | 1  | 1  |    |    |    |    | X  | X  |    |    |    |
| 7  |    |    | 1  | 1  | 1  |    |    |    | X  | X  |    |    |    |
| 8  |    | 1  |    |    |    |    | X  |    |    | X  | X  |    |    |
| 9  |    | 1  |    |    | 1  |    |    |    |    | X  | X  |    |    |
| 10 |    | 1  |    | 1  |    |    | X  |    |    | X  | X  |    | X  |
| 11 |    | 1  |    | 1  | 1  |    |    |    |    | X  | X  |    |    |
| 12 |    | 1  | 1  |    |    |    |    |    |    |    | X  |    |    |
| 13 |    | 1  | 1  |    | 1  |    | X  |    |    |    | X  |    |    |

TABLE I-continued

|    | A4 | A3 | A2 | A1 | A0 | B7 | B6 | B5 | B4 | B3 | B2 | B1 | B0 |
|----|----|----|----|----|----|----|----|----|----|----|----|----|----|
| 14 |    | 1  | 1  | 1  |    |    |    |    |    | X  |    | X  |    |
| 15 |    | 1  | 1  | 1  | 1  |    |    |    |    | X  |    |    |    |
| 16 | 1  |    |    |    |    |    | X  |    |    | X  |    |    |    |
| 17 | 1  |    |    |    | 1  |    |    | X  |    | X  |    |    |    |
| 18 | 1  |    |    | 1  |    |    |    |    |    | X  |    | X  |    |
| 19 | 1  |    |    | 1  | 1  |    | X  |    |    | X  |    |    |    |
| 20 | 1  |    | 1  |    |    |    |    |    |    | X  |    |    |    |
| 21 | 1  |    | 1  |    | 1  |    |    |    |    | X  |    |    |    |
| 22 | 1  |    | 1  | 1  |    |    |    |    |    | X  |    |    |    |
| 23 | 1  |    | 1  | 1  | 1  |    |    |    |    | X  |    |    |    |
| 24 | 1  | 1  |    |    |    |    |    |    |    |    |    |    |    |
| 25 | 1  | 1  |    |    | 1  |    |    |    |    |    |    |    |    |
| 26 | 1  | 1  |    | 1  |    |    |    |    |    |    |    |    |    |
| 27 | 1  | 1  |    | 1  | 1  |    |    |    |    |    |    |    |    |
| 28 | 1  | 1  | 1  |    |    |    |    |    | X  |    |    |    |    |
| 29 | 1  | 1  | 1  |    | 1  |    |    |    |    |    | X  |    |    |
| 30 | 1  | 1  | 1  | 1  |    |    |    |    |    |    | X  |    |    |
| 31 | 1  | 1  | 1  | 1  | 1  |    |    |    |    |    |    | X  |    |

Where:
A0 = End of Frame
A1 = Black Row
A2 = Current State-Bit 0
A3 = Current State-Bit 1
A4 = Current State-Bit 2
B0 = Reset Dim Light Flag
B1 = Decision Check Allow
B2 = Load Row Counter
B3 = Load Row Counter NOT
B4 = Reset
B5 = Dim Light
B6 = Character Check
B7 = Space Allow ROM 42 is a 32 × 8 bit preprogrammed in accordance with Table II.

TABLE II

|    | A4 | A3 | A2 | A1 | A0 | B7 | B6 | B5 | B4 | B3 | B2 | B1 | B0 |
|----|----|----|----|----|----|----|----|----|----|----|----|----|----|
| 0  |    |    |    |    |    |    |    |    |    |    |    |    |    |
| 1  |    |    |    |    | 1  |    |    |    |    |    |    |    |    |
| 2  |    |    |    | 1  |    |    | 1  |    |    |    |    |    |    |
| 3  |    |    |    | 1  | 1  |    | 1  |    |    |    |    |    |    |
| 4  |    |    | 1  |    |    |    | 1  |    | X  |    | X  |    |    |
| 5  |    |    | 1  |    | 1  |    | 1  |    |    | X  |    | X  |    |
| 6  |    |    | 1  | 1  |    |    | 1  |    | X  |    | X  |    |    |
| 7  |    |    | 1  | 1  | 1  |    |    |    | X  |    |    |    |    |
| 8  |    | 1  |    |    |    |    |    |    | X  |    |    | X  |    |
| 9  |    | 1  |    |    | 1  |    |    | X  | X  | X  | X  | X  |    |
| 10 |    | 1  |    | 1  |    | X  |    |    | X  |    |    | X  | X  |
| 11 |    | 1  |    | 1  | 1  |    |    |    | X  | X  |    | X  |    |
| 12 |    | 1  | 1  |    |    |    |    |    | X  |    | X  |    |    |
| 13 |    | 1  | 1  |    | 1  |    |    |    | X  | X  | X  | X  |    |
| 14 |    | 1  | 1  | 1  |    | X  |    |    |    |    | X  |    |    |
| 15 |    | 1  | 1  | 1  | 1  |    |    |    | X  | X  | X  |    |    |
| 16 | 1  |    |    |    |    |    |    |    | X  |    |    | X  |    |
| 17 | 1  |    |    |    | 1  |    |    |    | X  | X  | X  | X  |    |
| 18 | 1  |    |    | 1  |    |    |    |    | X  |    | X  |    |    |
| 19 | 1  |    |    | 1  | 1  |    |    |    | X  | X  | X  | X  |    |
| 20 | 1  |    | 1  |    |    |    | X  |    | X  |    |    |    |    |
| 21 | 1  |    | 1  |    | 1  |    |    | 1  | X  | X  |    |    |    |
| 22 | 1  |    | 1  | 1  |    |    |    | X  |    | X  |    |    |    |
| 23 | 1  |    | 1  | 1  | 1  |    |    | 1  | X  |    |    |    |    |
| 24 | 1  | 1  |    |    |    |    |    |    |    |    |    |    |    |
| 25 | 1  | 1  |    |    | 1  |    |    |    |    | 1  |    |    |    |
| 26 | 1  | 1  |    | 1  |    |    |    |    | 1  |    |    |    |    |
| 27 | 1  | 1  |    | 1  | 1  |    |    |    | 1  |    |    |    |    |
| 28 | 1  | 1  | 1  |    |    |    |    |    |    | X  |    |    |    |
| 29 | 1  | 1  | 1  |    | 1  |    |    |    |    | X  |    |    |    |
| 30 | 1  | 1  | 1  | 1  |    |    |    |    |    | X  |    |    |    |
| 31 | 1  | 1  | 1  | 1  | 1  |    |    |    |    | X  |    |    |    |

Where:
A0 = Black Row
A1 = Height Count/2 or space detected
A2 = Current State - Bit 0
B0 = Send Space
B1 = Increment Space Counter
B2 = Increment Height Counter
B3 = Reset White Path Tracer
B4 = Decision Check
B5 = Next State - Bit 0
B6 = Next State - Bit 1
B7 = Next State - Bit 2

Referring now to FIG. 3, channel 17 shown in FIG. 1, is also shown in FIG. 3 and serves to apply eight bits in parallel to a ROM 70. Six of the bits are also applied to a storage register 71. The output of storage register 71 is then applied to the decision resolution unit 18, and is not of further interest with respect to the present description.

ROM 70 and a ROM 72 cooperate with the remainder of the circuitry shown in FIG. 3 to produce a desired state on line 33 whenever the character identified by the input on channel 17 is too tall, i.e., exceeds a predetermined criteria as to character height. The system operates in conjunction with a height counter comprised of counter 73 and flip/flop 74 to count the height of the black stroke on a given white field. Output of counter 73 and flip/flop 74 are connected to the A3-A7 inputs of ROM 72. The outputs 75 from ROM 70 are applied to the A0-A2 inputs of ROM 72. A recognized character code on line 17 causes an output signal on one of lines 75, depending upon the identified character. This input signal to ROM 72 identifies the size range of the character and if the identified character exceeds the size range as defined by ROM 72 and counter 73, then a signal is generated on line 33 indicating that the character is too tall. Intraframe row clock 61 is connected to a reset terminal of counter 73. The reset line 32b is connected to a second reset terminal of counter 73.

ROM 70 was a 256 × 4 bit ROM. As used in the circuit of FIG. 3, it was programmed through the first 64 states in accordance with Table III.

TABLE III

| | A7 | A6 | A5 | A4 | A3 | A2 | A1 | A0 | B3 | B2 | B1 | B0 |
|---|---|---|---|---|---|---|---|---|---|---|---|---|
| 0 | | | | | | | | | | | | 1 |
| 1 | | | | | | | | 1 | | | 1 | |
| 2 | | | | | | | 1 | | | | 1 | |
| 3 | | | | | | | 1 | 1 | | | 1 | |
| 4 | | | | | | 1 | | | | 1 | | |
| 5 | | | | | | 1 | | 1 | | | 1 | 1 |
| 6 | | | | | | 1 | 1 | | | | 1 | 1 |
| 7 | | | | | | 1 | 1 | 1 | | | 1 | 1 |
| 8 | | | | | 1 | | | | | | 1 | |
| 9 | | | | | 1 | | | 1 | | | 1 | 1 |
| 10 | | | | | 1 | | 1 | | | | 1 | 1 |
| 11 | | | | | 1 | | 1 | 1 | | 1 | 1 | 1 |
| 12 | | | | | 1 | 1 | | | | | 1 | |
| 13 | | | | | 1 | 1 | | 1 | | 1 | | 1 |
| 14 | | | | | 1 | 1 | 1 | | | 1 | | 1 |
| 15 | | | | | 1 | 1 | 1 | 1 | | 1 | 1 | 1 |
| 16 | | | | 1 | | | | | | | | 1 |
| 17 | | | | 1 | | | | 1 | | | 1 | 1 |
| 18 | | | | 1 | | | 1 | | | 1 | | 1 |
| 19 | | | | 1 | | | 1 | 1 | | | 1 | 1 |
| 20 | | | | 1 | | 1 | | | | | 1 | 1 |
| 21 | | | | 1 | | 1 | | 1 | | 1 | | 1 |
| 22 | | | | 1 | | 1 | 1 | | | 1 | 1 | 1 |
| 23 | | | | 1 | | 1 | 1 | 1 | | 1 | 1 | 1 |
| 24 | | | | 1 | 1 | | | | | | | 1 |
| 25 | | | | 1 | 1 | | | 1 | | | 1 | 1 |
| 26 | | | | 1 | 1 | | 1 | | | 1 | 1 | |
| 27 | | | | 1 | 1 | | 1 | 1 | | 1 | 1 | 1 |
| 28 | | | | 1 | 1 | 1 | | | | 1 | | 1 |
| 29 | | | | 1 | 1 | 1 | | 1 | | 1 | | 1 |
| 30 | | | | 1 | 1 | 1 | 1 | | | 1 | 1 | 1 |
| 31 | | | | 1 | 1 | 1 | 1 | 1 | | 1 | 1 | 1 |
| 32 | | | 1 | | | | | | | | | 1 |
| 33 | | | 1 | | | | | 1 | | | 1 | 1 |
| 34 | | | 1 | | | | 1 | | | 1 | | 1 |
| 35 | | | 1 | | | | 1 | 1 | | | 1 | 1 |
| 36 | | | 1 | | | 1 | | | | | 1 | 1 |
| 37 | | | 1 | | | 1 | | 1 | | | 1 | 1 |
| 38 | | | 1 | | | 1 | 1 | | | 1 | 1 | |
| 39 | | | 1 | | | 1 | 1 | 1 | | 1 | 1 | 1 |
| 40 | | | 1 | | 1 | | | | | | | 1 |
| 41 | | | 1 | | 1 | | | 1 | | | 1 | 1 |
| 42 | | | 1 | | 1 | | 1 | | | 1 | 1 | |
| 43 | | | 1 | | 1 | | 1 | 1 | | 1 | 1 | |
| 44 | | | 1 | | 1 | 1 | | | | | 1 | |
| 45 | | | 1 | | 1 | 1 | | 1 | | 1 | 1 | |
| 46 | | | 1 | | 1 | 1 | 1 | | | 1 | | 1 |
| 47 | | | 1 | | 1 | 1 | 1 | 1 | | | | 1 |
| 48 | | | 1 | 1 | | | | | | | | 1 |
| 49 | | | 1 | 1 | | | | 1 | | 1 | | 1 |
| 50 | | | 1 | 1 | | | 1 | | | | 1 | |
| 51 | | | 1 | 1 | | | 1 | 1 | | 1 | 1 | |
| 52 | | | 1 | 1 | | 1 | | | | | | 1 |
| 53 | | | 1 | 1 | | 1 | | 1 | | 1 | | 1 |
| 54 | | | 1 | 1 | | 1 | 1 | | | 1 | 1 | |
| 55 | | | 1 | 1 | | 1 | 1 | 1 | | | 1 | |
| 56 | | | 1 | 1 | 1 | | | | | | 1 | |
| 57 | | | 1 | 1 | 1 | | | 1 | | | 1 | |
| 58 | | | 1 | 1 | 1 | | 1 | | | 1 | 1 | |
| 59 | | | 1 | 1 | 1 | | 1 | 1 | | 1 | 1 | |
| 60 | | | 1 | 1 | 1 | 1 | | | | | 1 | |
| 61 | | | 1 | 1 | 1 | 1 | | 1 | | | 1 | |
| 62 | | | 1 | 1 | 1 | 1 | 1 | | 1 | | | 1 |
| 63 | | | 1 | 1 | 1 | 1 | 1 | 1 | | | | |

Where:
A0-A7 = Decision Network — Bits 0-7
B0 = Height Test Code Bit 0
B1 = Height Test Code Bit 1
B2 = Height Test Code Bit 2
B3 = NOT Decision Similarly, ROM 72 is a 256 × 4 bit ROM programmed through its 256 states in accordance with Table IV.

TABLE IV

| | A7 | A6 | A5 | A4 | A3 | A2 | A1 | A0 | B3 | B2 | B1 | B0 |
|---|---|---|---|---|---|---|---|---|---|---|---|---|
| 0 | | | | | | | | | | | | |
| 1 | | | | | | | | 1 | | | 1 | |
| 2 | | | | | | | 1 | | | | 1 | |
| 3 | | | | | | | 1 | 1 | | | 1 | 1 |
| 4 | | | | | | 1 | | | | 1 | | |
| 5 | | | | | | 1 | | 1 | | | 1 | |
| 6 | | | | | | 1 | 1 | | | 1 | 1 | |
| 7 | | | | | | 1 | 1 | 1 | | | 1 | 1 |
| 8 | | | | | 1 | | | | | 1 | | |
| 9 | | | | | 1 | | | 1 | | | | 1 |
| 10 | | | | | 1 | | 1 | | | 1 | | 1 |
| 11 | | | | | 1 | | 1 | 1 | | 1 | | 1 |
| 12 | | | | | 1 | 1 | | | | 1 | | |
| 13 | | | | | 1 | 1 | | 1 | | 1 | 1 | |
| 14 | | | | | 1 | 1 | 1 | | | 1 | 1 | 1 |
| 15 | | | | | 1 | 1 | 1 | 1 | | 1 | 1 | 1 |
| 16 | | | | 1 | | | | | 1 | | | |
| 17 | | | | 1 | | | | 1 | | | 1 | |
| 18 | | | | 1 | | | 1 | | | 1 | | |
| 19 | | | | 1 | | | 1 | 1 | | | 1 | 1 |
| 20 | | | | 1 | | 1 | | | | 1 | | |
| 21 | | | | 1 | | 1 | | 1 | | 1 | 1 | |
| 22 | | | | 1 | | 1 | 1 | | | 1 | 1 | 1 |
| 23 | | | | 1 | | 1 | 1 | 1 | | 1 | 1 | 1 |
| 24 | | | | 1 | 1 | | | | 1 | | | |
| 25 | | | | 1 | 1 | | | 1 | | 1 | | |
| 26 | | | | 1 | 1 | | 1 | | | 1 | | 1 |
| 27 | | | | 1 | 1 | | 1 | 1 | | 1 | 1 | |
| 28 | | | | 1 | 1 | 1 | | | | 1 | 1 | |
| 29 | | | | 1 | 1 | 1 | | 1 | | 1 | 1 | 1 |
| 30 | | | | 1 | 1 | 1 | 1 | | 1 | 1 | 1 | |
| 31 | | | | 1 | 1 | 1 | 1 | 1 | 1 | 1 | 1 | 1 |
| 32 | | 1 | | | | | | | | | 1 | |
| 33 | | 1 | | | | | | 1 | | | 1 | |
| 34 | | 1 | | | | | 1 | | | 1 | | |
| 35 | | 1 | | | | | 1 | 1 | | 1 | 1 | |
| 36 | | 1 | | | | 1 | | | | | 1 | |
| 37 | | 1 | | | | 1 | | 1 | | | 1 | 1 |
| 38 | | 1 | | | | 1 | 1 | | | 1 | 1 | |
| 39 | | 1 | | | | 1 | 1 | 1 | | 1 | 1 | 1 |
| 40 | | 1 | | | 1 | | | | | 1 | | |
| 41 | | 1 | | | 1 | | | 1 | | 1 | | 1 | 1 |
| 42 | | 1 | | | 1 | | 1 | | | 1 | | |
| 43 | | 1 | | | 1 | | 1 | 1 | | 1 | 1 | |
| 44 | | 1 | | | 1 | 1 | | | | 1 | | |
| 45 | | 1 | | | 1 | 1 | | 1 | | 1 | | 1 |
| 46 | | 1 | | | 1 | 1 | 1 | | | 1 | 1 | 1 |
| 47 | | 1 | | | 1 | 1 | 1 | 1 | | 1 | 1 | 1 |
| 48 | | 1 | | 1 | | | | | | | | 1 |
| 49 | | 1 | | 1 | | | | 1 | | | 1 | 1 | 1 |
| 50 | | 1 | | 1 | | | 1 | | | 1 | | |
| 51 | | 1 | | 1 | | | 1 | 1 | | 1 | 1 | |
| 52 | | 1 | | 1 | | 1 | | | | 1 | | |
| 53 | | 1 | | 1 | | 1 | | 1 | | 1 | 1 | |
| 54 | | 1 | | 1 | | 1 | 1 | | | 1 | 1 | 1 |
| 55 | | 1 | | 1 | | 1 | 1 | 1 | | 1 | 1 | 1 |
| 56 | | 1 | | 1 | 1 | | | | | 1 | 1 | |
| 57 | | 1 | | 1 | 1 | | | 1 | | | 1 | 1 | 1 |
| 58 | | 1 | | 1 | 1 | | 1 | | | 1 | 1 | |
| 59 | | 1 | | 1 | 1 | | 1 | 1 | | 1 | 1 | |
| 60 | | 1 | | 1 | 1 | 1 | | | | 1 | | |
| 61 | | 1 | | 1 | 1 | 1 | | 1 | | 1 | 1 | 1 | 1 |
| 62 | | 1 | | 1 | 1 | 1 | 1 | | | 1 | 1 | 1 |
| 63 | | 1 | | 1 | 1 | 1 | 1 | 1 | | 1 | 1 | 1 |
| 64 | | | 1 | | | | | | | | | 1 |
| 65 | | | 1 | | | | | 1 | | | 1 | |
| 66 | | | 1 | | | | 1 | | | | 1 | |

TABLE IV-continued

| | A7 | A6 | A5 | A4 | A3 | A2 | A1 | A0 | B3 | B2 | B1 | B0 |
|---|---|---|---|---|---|---|---|---|---|---|---|---|
| 67 | | 1 | | | | 1 | 1 | | | | | |
| 68 | | 1 | | | 1 | | | | | | | |
| 69 | | 1 | | | 1 | | 1 | | 1 | 1 | 1 | |
| 70 | | 1 | | | 1 | 1 | | | | | | |
| 71 | | 1 | | | 1 | 1 | 1 | | | | | |
| 72 | | 1 | | 1 | | | | | | | | |
| 73 | | 1 | | 1 | | | 1 | | | | | |
| 74 | | 1 | | 1 | | 1 | | | | | | |
| 75 | | 1 | | 1 | | 1 | 1 | | | | | |
| 76 | | 1 | | 1 | 1 | | | | 1 | 1 | | |
| 77 | | 1 | | 1 | 1 | | 1 | | 1 | 1 | | 1 |
| 78 | | 1 | | 1 | 1 | 1 | | | | | | |
| 79 | | 1 | | 1 | 1 | 1 | 1 | | | | | |
| 80 | | 1 | 1 | | | | | | | | | |
| 81 | | 1 | 1 | | | | 1 | | | | | |
| 82 | | 1 | 1 | | | 1 | | | | | | |
| 83 | | 1 | 1 | | | 1 | 1 | | | | | |
| 84 | | 1 | 1 | | 1 | | | | 1 | 1 | | |
| 85 | | 1 | 1 | | 1 | | 1 | | 1 | 1 | | 1 |
| 86 | | 1 | 1 | | 1 | 1 | | | | | | |
| 87 | | 1 | 1 | | 1 | 1 | 1 | | | | | |
| 88 | | 1 | 1 | 1 | | | | | | | 1 | |
| 89 | | 1 | 1 | 1 | | | 1 | | | | 1 | |
| 90 | | 1 | 1 | 1 | | 1 | | | | 1 | 1 | |
| 91 | | 1 | 1 | 1 | | 1 | 1 | | | 1 | 1 | |
| 92 | | 1 | 1 | 1 | 1 | | | | 1 | | 1 | |
| 93 | | 1 | 1 | 1 | 1 | | 1 | | | | 1 | |
| 94 | | 1 | 1 | 1 | 1 | 1 | | | | | | |
| 95 | | 1 | 1 | 1 | 1 | 1 | 1 | | | | | |
| 96 | | 1 | 1 | | | | | | | | | 1 |
| 97 | | 1 | 1 | | | | 1 | | | | | 1 |
| 98 | | 1 | 1 | | | 1 | | | | | | 1 |
| 99 | | 1 | 1 | | | 1 | 1 | | | 1 | 1 | |
| 100 | | 1 | 1 | | 1 | | | | | | | 1 |
| 101 | | 1 | 1 | | 1 | | 1 | | | | | 1 |
| 102 | | 1 | 1 | | 1 | 1 | | | | | | |
| 103 | | 1 | 1 | | 1 | 1 | 1 | | | | | |
| 104 | | 1 | 1 | 1 | | | | | | | | 1 |
| 105 | | 1 | 1 | 1 | | | 1 | | | | | 1 |
| 106 | | 1 | 1 | 1 | | 1 | | | | 1 | 1 | |
| 107 | | 1 | 1 | 1 | | 1 | 1 | | | 1 | 1 | |
| 108 | | 1 | 1 | 1 | 1 | | | | | 1 | 1 | |
| 109 | | 1 | 1 | 1 | 1 | | 1 | | | | | 1 |
| 110 | | 1 | 1 | 1 | 1 | 1 | | | | | | |
| 111 | | 1 | 1 | 1 | 1 | 1 | 1 | | | | | |
| 112 | | 1 | 1 | 1 | | | | | | | | 1 |
| 113 | | 1 | 1 | 1 | | | 1 | | | | | |
| 114 | | 1 | 1 | 1 | | 1 | | | 1 | 1 | | |
| 115 | | 1 | 1 | 1 | | 1 | 1 | | 1 | 1 | | |
| 116 | | 1 | 1 | 1 | 1 | | | | 1 | 1 | | |
| 117 | | 1 | 1 | 1 | 1 | | 1 | | | | | 1 |
| 118 | | 1 | 1 | 1 | 1 | 1 | | | | | | |
| 119 | | 1 | 1 | 1 | 1 | 1 | 1 | | | | | |
| 120 | | 1 | 1 | 1 | | | | | | | | 1 |
| 121 | | 1 | 1 | 1 | | | 1 | | | | | |
| 122 | | 1 | 1 | 1 | | 1 | | | 1 | | | 1 |
| 123 | | 1 | 1 | 1 | | 1 | 1 | | | | | 1 |
| 124 | | 1 | 1 | 1 | 1 | | | | | | | 1 |
| 125 | | 1 | 1 | 1 | 1 | | 1 | | | | | 1 |
| 126 | | 1 | 1 | 1 | 1 | 1 | | | | | | |
| 127 | | 1 | 1 | 1 | 1 | 1 | 1 | | | | | |
| 128 | 1 | | | | | | | | | | | 1 |
| 129 | 1 | | | | | | 1 | | | | | 1 |
| 130 | 1 | | | | | 1 | | | | 1 | 1 | |
| 131 | 1 | | | | | 1 | 1 | | | | | |
| 132 | 1 | | | | 1 | | | | | | | 1 |
| 133 | 1 | | | | 1 | | 1 | | | | | 1 |
| 134 | 1 | | | | 1 | 1 | | | | | | |
| 135 | 1 | | | | 1 | 1 | 1 | | | | | |
| 136 | 1 | | | 1 | | | | | | | | 1 |
| 137 | 1 | | | 1 | | | 1 | | | | | 1 |
| 138 | 1 | | | 1 | | 1 | | | 1 | 1 | | |
| 139 | 1 | | | 1 | | 1 | 1 | | | | | 1 |
| 140 | 1 | | | 1 | 1 | | | | | | | |
| 141 | 1 | | | 1 | 1 | | 1 | | | | | 1 |
| 142 | 1 | | | 1 | 1 | 1 | | | | | | |
| 143 | 1 | | | 1 | 1 | 1 | 1 | | | | | |
| 144 | 1 | | 1 | | | | | | | | | 1 |
| 145 | 1 | | 1 | | | | 1 | | | | | 1 |
| 146 | 1 | | 1 | | | 1 | | | 1 | | | 1 |
| 147 | 1 | | 1 | | | 1 | 1 | | | | | 1 |
| 148 | 1 | | 1 | | 1 | | | | | | | 1 |
| 149 | 1 | | 1 | | 1 | | 1 | | | | | 1 |
| 150 | 1 | | 1 | | 1 | 1 | | | | | | |
| 151 | 1 | | 1 | | 1 | 1 | 1 | | | | | |
| 152 | 1 | | 1 | 1 | | | | | | | | 1 |
| 153 | 1 | | 1 | 1 | | | 1 | | | | | 1 |
| 154 | 1 | | 1 | 1 | | 1 | | | 1 | | | 1 |
| 155 | 1 | | 1 | 1 | | 1 | 1 | | | | | |
| 156 | 1 | | 1 | 1 | 1 | | | | | | | 1 |
| 157 | 1 | | 1 | 1 | 1 | | 1 | | | | | 1 |
| 158 | 1 | | 1 | 1 | 1 | 1 | | | | | | |
| 159 | 1 | | 1 | 1 | 1 | 1 | 1 | | | | | |
| 160 | 1 | | 1 | | | | | | | 1 | | |
| 161 | 1 | | 1 | | | | 1 | | | 1 | | 1 |
| 162 | 1 | | 1 | | | 1 | | | 1 | | 1 | 1 |
| 163 | 1 | | 1 | | | 1 | 1 | | | | | |
| 164 | 1 | | 1 | | 1 | | | | | | | 1 |
| 165 | 1 | | 1 | | 1 | | 1 | | | | | 1 |
| 166 | 1 | | 1 | | 1 | 1 | | | | | | |
| 167 | 1 | | 1 | | 1 | 1 | 1 | | | | | |
| 168 | 1 | | 1 | 1 | | | | | | 1 | | |
| 169 | 1 | | 1 | 1 | | | 1 | | | | | 1 |
| 170 | 1 | | 1 | 1 | | 1 | | | | 1 | 1 | |
| 171 | 1 | | 1 | 1 | | 1 | 1 | | | | | 1 |
| 172 | 1 | | 1 | 1 | 1 | | | | | | | 1 |
| 173 | 1 | | 1 | 1 | 1 | | 1 | | | 1 | | 1 |
| 174 | 1 | | 1 | 1 | 1 | 1 | | | | | | |
| 175 | 1 | | 1 | 1 | 1 | 1 | 1 | | | | | |
| 176 | 1 | | 1 | 1 | | | | | | | | 1 |
| 177 | 1 | | 1 | 1 | | | 1 | | | | | 1 |
| 178 | 1 | | 1 | 1 | | 1 | | | 1 | | 1 | 1 |
| 179 | 1 | | 1 | 1 | | 1 | 1 | | | | | 1 |
| 180 | 1 | | 1 | 1 | 1 | | | | | | | 1 |
| 181 | 1 | | 1 | 1 | 1 | | 1 | | | | | 1 |
| 182 | 1 | | 1 | 1 | 1 | 1 | | | | | | |
| 183 | 1 | | 1 | 1 | 1 | 1 | 1 | | | | | |
| 184 | 1 | | 1 | 1 | | | | | | | | 1 |
| 185 | 1 | | 1 | 1 | | | 1 | | | | | 1 |
| 186 | 1 | | 1 | 1 | | 1 | | | 1 | | 1 | 1 |
| 187 | 1 | | 1 | 1 | | 1 | 1 | | | | | 1 |
| 188 | 1 | | 1 | 1 | 1 | | | | | | | 1 |
| 189 | 1 | | 1 | 1 | 1 | | 1 | | | | | 1 |
| 190 | 1 | | 1 | 1 | 1 | 1 | | | | | | |
| 191 | 1 | | 1 | 1 | 1 | 1 | 1 | | | | | |
| 192 | 1 | 1 | | | | | | | | | | 1 |
| 193 | 1 | 1 | | | | | 1 | | | | 1 | |
| 194 | 1 | 1 | | | | 1 | | | | | 1 | 1 |
| 195 | 1 | 1 | | | | 1 | 1 | | | | | |
| 196 | 1 | 1 | | | 1 | | | | | | | 1 |
| 197 | 1 | 1 | | | 1 | | 1 | | | | | 1 |
| 198 | 1 | 1 | | | 1 | 1 | | | | | | |
| 199 | 1 | 1 | | | 1 | 1 | 1 | | | | | |
| 200 | 1 | 1 | | | 1 | | | | | | | 1 |
| 201 | 1 | 1 | | | 1 | | 1 | | | | 1 | 1 |
| 202 | 1 | 1 | | | 1 | 1 | | | | 1 | | 1 |
| 203 | 1 | 1 | | | 1 | 1 | 1 | | | | | |
| 204 | 1 | 1 | | 1 | 1 | | | | | | | 1 |
| 205 | 1 | 1 | | 1 | 1 | | 1 | | | | | 1 |
| 206 | 1 | 1 | | 1 | 1 | 1 | | | | | | |
| 207 | 1 | 1 | | 1 | 1 | 1 | 1 | | | | | |
| 208 | 1 | 1 | | 1 | | | | | | 1 | | 1 |
| 209 | 1 | 1 | | 1 | | | 1 | | | 1 | | 1 |
| 210 | 1 | 1 | | 1 | | 1 | | | | 1 | 1 | 1 |
| 211 | 1 | 1 | | 1 | | 1 | 1 | | | 1 | 1 | |
| 212 | 1 | 1 | | 1 | 1 | | | | | 1 | | 1 |
| 213 | 1 | 1 | | 1 | 1 | | 1 | | | 1 | | 1 |
| 214 | 1 | 1 | | 1 | 1 | 1 | | | | 1 | | 1 |
| 215 | 1 | 1 | | 1 | 1 | 1 | 1 | | | 1 | | |
| 216 | 1 | 1 | | 1 | | | | | | 1 | | 1 |
| 217 | 1 | 1 | | 1 | | | 1 | | | 1 | | 1 |
| 218 | 1 | 1 | | 1 | | 1 | | | 1 | | 1 | 1 |
| 219 | 1 | 1 | | 1 | | 1 | 1 | | | 1 | 1 | |
| 220 | 1 | 1 | | 1 | 1 | | | | | 1 | | 1 |
| 221 | 1 | 1 | | 1 | 1 | | 1 | | | 1 | | 1 |
| 222 | 1 | 1 | | 1 | 1 | 1 | | | 1 | | 1 | |
| 223 | 1 | 1 | | 1 | 1 | 1 | 1 | | | 1 | | |
| 224 | 1 | 1 | 1 | | | | | | | 1 | | 1 |
| 225 | 1 | 1 | 1 | | | | 1 | | | 1 | | 1 |
| 226 | 1 | 1 | 1 | | | 1 | | | | 1 | | 1 |
| 227 | 1 | 1 | 1 | | | 1 | 1 | | | 1 | | 1 |
| 228 | 1 | 1 | 1 | | 1 | | | | | | | 1 |
| 229 | 1 | 1 | 1 | | 1 | | 1 | | | 1 | | 1 |
| 230 | 1 | 1 | 1 | | 1 | 1 | | | | 1 | | |
| 231 | 1 | 1 | 1 | | 1 | 1 | 1 | | | 1 | | |
| 232 | 1 | 1 | 1 | 1 | | | | | | 1 | | |
| 233 | 1 | 1 | 1 | 1 | | | 1 | | | 1 | | |
| 234 | 1 | 1 | 1 | 1 | | 1 | | | | | 1 | 1 |
| 235 | 1 | 1 | 1 | 1 | | 1 | 1 | | | 1 | | |
| 236 | 1 | 1 | 1 | 1 | 1 | | | | | 1 | | 1 |
| 237 | 1 | 1 | 1 | 1 | 1 | | 1 | | | 1 | | 1 |
| 238 | 1 | 1 | 1 | 1 | 1 | 1 | | | | 1 | | 1 |
| 239 | 1 | 1 | 1 | 1 | 1 | 1 | 1 | | | 1 | | 1 |
| 240 | 1 | 1 | 1 | 1 | | | | | | | | 1 |
| 241 | 1 | 1 | 1 | 1 | | | 1 | | | 1 | | 1 |
| 242 | 1 | 1 | 1 | 1 | | 1 | | | 1 | | 1 | 1 |
| 243 | 1 | 1 | 1 | 1 | | 1 | 1 | | | 1 | | 1 |
| 244 | 1 | 1 | 1 | 1 | 1 | | | | | | | 1 |
| 245 | 1 | 1 | 1 | 1 | 1 | | 1 | | | 1 | | 1 |
| 246 | 1 | 1 | 1 | 1 | 1 | 1 | | | 1 | | 1 | 1 |
| 247 | 1 | 1 | 1 | 1 | 1 | 1 | 1 | | | 1 | | 1 |
| 248 | 1 | 1 | 1 | 1 | | | | | | | | 1 |
| 249 | 1 | 1 | 1 | 1 | | | 1 | | | 1 | | 1 |
| 250 | 1 | 1 | 1 | 1 | 1 | | 1 | | 1 | | | |

TABLE IV-continued

| | A7 | A6 | A5 | A4 | A3 | A2 | A1 | A0 | B3 | B2 | B1 | B0 |
|---|---|---|---|---|---|---|---|---|---|---|---|---|
| 251 | 1 | 1 | 1 | 1 | 1 | | 1 | 1 | 1 | | | |
| 252 | 1 | 1 | 1 | 1 | 1 | 1 | | | 1 | | | |
| 253 | 1 | 1 | 1 | 1 | 1 | 1 | | 1 | 1 | | 1 | |
| 254 | 1 | 1 | 1 | 1 | 1 | 1 | 1 | | 1 | | | |
| 255 | 1 | 1 | 1 | 1 | 1 | 1 | 1 | 1 | 1 | | | 1 |

Where:
A0, A1, A2 = Height Test Code —Bit 0, 1, 2
A3 = Height Counter Bit 0
A4 = Height Counter Bit 1
A5 = Height Counter Bit 2
A6 = Height Counter Bit 3
A7 = Height Counter Bit 4
B0 = Add 6
B1 = Reset Too Short
B2 = Send Decision
B3 = Set Too Tall The circuit constructed and connected as shown in FIG. 3 causes a selected state to appear on line 33 when the character coded on the input line 17 is too tall.

When the lights in wand 10 are dimmed, the state Lines 32 and 33 are connected by way of an OR gate 80 to one input of a flip/flop 81, which comprises the dimmer flag. The Q output of flip/flop 81 is connected to the J input of the flip/flop 82.

The line 32a is connected to the K input of flip/flop 81. The intraframe row clock signal is applied from source 61 to the clock input terminal of flip/flop 81 as well as to an input of an AND gate 83. The second input of AND gate 83 appears on line 32c. The output of AND gate 83 is connected to the clock input terminal of counter of flip/flop 82. The Q output of flip/flop 82 is then connected to a timer 84. Timer 84 provides an output control voltage on line 85 after a predetermined delay following the input from the Q terminal of flip/flop 82.

Line 85 is connected by way of a resistor 86 to the base of the transistor 87. The transistor 87 is connected by way of resistor 88 to the base of a transistor 89. The emitter of transistor 89 is connected to three points: directly to a six-volt source; by way of resistor 90 to the base thereof; and by way of resistor 91 to the collector thereof. The collector is then connected to one terminal of one or more lamps 92 in wand 10. The other terminal for lamps 92 is connected to ground.

In operation, if the control state appears on either lines 32 or 33, then the flag flip/flop 81 is set. The information stored in flip/flop 81 is transferred once per frame, in response to the load row counter signal applied by line 32c to AND gate 83. The control is then stored in flip/flop 82 for one frame. If the Q output state from flip/flop 82 does not change for a period of the timer 84, then the effective impedance of transistor 89 is increased by turning on transistor 87. This, then causes lamps 92 to be operated at a dim or low excitation level.

Assuming that the lamps 92 are at a low excitation level, it will stay at that level until at least one row in a succeeding frame has a white output signal. The instant that the state which actuates timer 84 disappears or is illuminated, the timer 84 resets and the lamps in bank 92 instantly return to full excitation brightly to illuminate the field sensed by the wand.

It will be noted that the output of ROM 72 provides, through AND gate to flip/flops 93 and 94, output signals indicating that the character is too tall or is too short, respectively. The latter signals are utilized in the decision resolution unit 18. However, for the purpose of the present invention, the alphanumeric reading of characters on a date field scanned by wand 10 is carried out where a first signal is developed through OR gate 40 for each black row across a field being scanned. A second signal is developed on line 33 wherein any character sensed is too tall. A circuit is provided which is responsive to the first signal to set the flag 81 when a predetermined number of the first signal are produced. This signal appears at the output of ROM 41. Means are also provided to set the state flag 81 then produces an output signal applied to transistor 87 in response to a delayed state flag. After a predetermined time delay the excitation of the lamp 92 is reduced. Timer 84 instantly resets when a white signal appears in any row of any character field subsequently scanned, i.e., when the state on both lines 32 and 33 is low.

ROM 41 and 42 are 32 × 8 bit units of the type manufactured and sold by Texas Instruments Incorporated, Dallas, Tex. (TI) and identified as Catalog No. 7488.

Shift register 43 is of the type generally available from suppliers under the catalog designation 7495, comprising a 4 bit shift register.

Counter 45 is a 4 bit counter manufactured and sold by TI and generally available under Catalog No. 74163.

Counter 46 is of the type manufactured and sold by TI and identified Catalog No. 7493.

Adder 49 is of the type manufactured and sold by TI and identified as Catalog No. 74283.

Latch 50 is a 4 bit latch of the type manufactured and sold by TI and identified as Catalog No. 7475.

Space counter 54 is of the type identified by Catalog No. 74163.

ROMs 70 and 72 are 256 × 4 bit ROMS of the type manufactured by TI and identified by Catalog No. 74187.

Storage register 71 is a 6 bit storage register of the type identified by Catalog No. 74174.

Height counter 73 is a 4 bit counter identified by Catalog No. 7493.

Timer 84 is of the type identified by Catalog No. 555.

While they play no direct part in the present invention, legends on FIGS. 2 and 3 are defined as follows and indicate the functions involved:

| | |
|---|---|
| IFEOF | Intraframe End of Frame |
| BLKROW | Black Row |
| CHARCHK | Character Check |
| IFRCLK | Intraframe Row Clock |
| SPCENA | Space Enable |
| IFROWCLK.01 | Intraframe Row Clock .01 |
| RRCNT | Reset Row Counter |
| IFRCLKB | Intraframe Row Clock |
| DNHTC.0 | Decision Network Height Test Code 0 |
| DNHTC.1 | Decision Network Height Test Code 1 |
| DNHTC.2 | Decision Network Height Test Code 2 |
| WPTS2 | White Path Tracer State Bit 2 |
| WPTS3 | White Path Tracer State Bit 3 |
| RST NETWORK | Reset Network |
| HCB.0 | Height Counter Bit 0 |
| HCC | Height Counter Clock |
| RUTOOTALL | Recognition Output Too Tall |
| RUTOOSHORT | Recognition Output Too Short |
| RSTTOOSHT | Reset Too Short |
| EXHT | Execute Height Test |

Having described the invention in connection with certain specific embodiments thereof, it is to be understood that further modifications may now suggest themselves to those skilled in the art and it is intended to cover such modifications as fall within the scope of the appended claims.

What is claimed is:

1. The combination comprising:
   (a) a hand-held OCR wand having a photosensor array positioned to sense light reflected into said wand from a document through a reading aperture therein, the output of said array being a video signal, (b) a lamp carried by said wand for illuminating the document facing said aperture for reflection of light onto said array, (c) recognition means connected to said array to produce a control state when the video signal from said array is below a predetermined level, (d) timer means responsive to said control state and operable after a predetermined time delay to reduce the power supplied to said lamp, and (e) means to reset said timer means in response to a change of said control state.

2. The combination set forth in claim 1 in which said array is a multi row, multi column matrix of light sensors and said recognition means includes a stored code unit responsive to each scan of all rows in said sensor array to produce said control state.

3. The combination set forth in claim 1 wherein means are provided for delaying by one scan of all rows in said array the application of said control state to said timer means.

4. The combination set forth in claim 1 in which said recognition means includes a stored program means to produce said control state when any black portion of a reflecting field facing said aperture is taller than a predetermined limit.

5. The combination comprising:

(a) a hand-held OCR wand having a photosensor array positioned to secure light reflected into said wand from a document through a reading aperture, the output of said array being a video signal, (b) a lamp carried within said wand adapted to direct light through said aperture for reflection from the document back into said wand and said array, (c) recognition means connected to said array to produce a control voltage when the video signal from said array is below a predetermined level, (d) timer means responsive to said control voltage and operable after a predetermined time delay to reduce the power to said lamp, and (e) means to reset said timer means in response to removal of said control voltage.

6. The combination set forth in claim 5 in which said timer means is set for a three second delay.

7. In reading alphanumeric characters appearing on a data field illuminated by a lamp and wherein multiple frames of output are produced from a sensor array and where a first signal is developed for each black row in any frame and a second signal is developed when a too tall character is detected in any frame, (a) means responsive to said first signal to generate a control voltage when a predetermined number of said first signals are produced in a given frame, (b) means to generate said control voltage in response to said second signal, (c) timer means to produce an output signal in response to said control voltage after a predetermined time delay and operable to reduce power supplied to said lamp, and (d) reset means operable instantly to reset said timer upon removal of said control voltage.

8. In reading alphanumeric characters appearing on a data field illuminated by a lamp and wherein multiple frames of output are produced from a sensor array and where a first signal is developed for each black row in any frame and a second signal is developed when a too tall character is detected in any frame, the combination comprising:

(a) means responsive to said first signal to generate a control voltage in response to one of a predetermined number of said first signals in a given frame and responsive to said second signal to generate said control voltage when a too tall character is detected in any frame, (b) timer means to produce an output signal in response to said control voltage after a predetermined time delay and operable to reduce power supplied to said lamp, and (c) reset means operable to reset said timer upon removal of said control voltage in a time short compared with said time delay.

* * * * *